(12) United States Patent
Ben Itay et al.

(10) Patent No.: US 9,037,399 B2
(45) Date of Patent: May 19, 2015

(54) PLUGGABLE ROUTE-PLANNING MODULE

(75) Inventors: Meir Ben Itay, Sammamish, WA (US);
Brian Beckman, Necastle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 168 days.

(21) Appl. No.: 13/527,694

(22) Filed: Jun. 20, 2012

(65) Prior Publication Data
US 2013/0345960 A1    Dec. 26, 2013

(51) Int. Cl.
*G01C 21/34* (2006.01)
*G01C 21/32* (2006.01)
*H04J 14/02* (2006.01)

(52) U.S. Cl.
CPC ............. *G01C 21/32* (2013.01); *H04J 14/0206* (2013.01)

(58) Field of Classification Search
CPC .............. G06F 3/00; G06F 5/00; G06F 15/16
USPC .......... 701/400–414, 424–429; 340/988–990, 340/995.1, 995.11–995.19
See application file for complete search history.

(56) References Cited

U.S. PATENT DOCUMENTS

| | | |
|---|---|---|
| 7,120,538 B2 | 10/2006 | Seifert |
| 7,447,593 B2 | 11/2008 | Estkowski et al. |
| 7,962,281 B2 | 6/2011 | Rasmussen et al. |
| 2005/0268245 A1 | 12/2005 | Gipps et al. |
| 2008/0270254 A1* | 10/2008 | Patoureaux et al. ............ 705/26 |
| 2009/0012703 A1 | 1/2009 | Aso et al. |
| 2009/0132469 A1* | 5/2009 | White et al. ...................... 707/2 |
| 2011/0276887 A1* | 11/2011 | Cohen et al. .................. 715/736 |
| 2013/0173152 A1* | 7/2013 | Schilling et al. .............. 701/527 |

OTHER PUBLICATIONS

Reynolds, Craig, "OpenSteer Documentation", Retrieved at <<http://opensteer.sourceforge.net/doc.html>>, Nov. 11, 2004, pp. 17.
Unsal, et al., "Simulation Study of Learning Automata Games in Automated Highway Systems", Retrieved at <<http://www-cgi.cs.cmu.edu./~unsal/publications/itsc.pdf>>, 1st IEEE International Transportation Systems Conference (ITSC), Nov. 9-12, 1997, pp. 936-941.
"Automated Guided Vehicle Systems Call for Complicated Route Calculations", Retrieved at <<www.cad6.com/archive/MKCAD6-Report-AGV.pdf>>, Retrieved Date: Jan. 9, 2012, pp. 5.

* cited by examiner

*Primary Examiner* — Dalena Tran
(74) *Attorney, Agent, or Firm* — Steven Spellman; Jim Ross; Micky Minhas

(57) ABSTRACT

Among other things, one or more techniques and/or systems are provided for configuring a route-planning module using one or more configuration plug-ins. The route-planning module may be configured to create a driving route, an internet packet route, a social event route, and/or a variety of other routes. A graph used by the route-planning module to create a route may be modified by a graph configuration plug-in, which may add, remove, and/or modify nodes and/or edges within the graph. Attributes associated with edges and/or nodes within the graph may be added, removed, and/or modified by an attribute configuration plug-in. Costs associated with edges and/or turns from a first edge to a second edge at a node may be modified by a cost configuration plug-in. In this way, the route-planning module may be customized using one or more configuration plug-ins (e.g., to accommodate user preferences).

20 Claims, 9 Drawing Sheets

PLUGGABLE ROUTE-PLANNING MODULE

BACKGROUND

Many applications, web pages, and/or web services may provide route planning functionality. For example, route planning functionality may be used to for traffic routing, internet packet routing, software installation planning, building construction planning, social event planning, and/or other various applications. In one example, a map application may provide a textual and/or visual driving route from a starting location to a destination location associated with a map. In another example, a vacation planning service may provide a vacation schedule for a user while on vacation (e.g., a boat ride event followed by a tour event followed by lunch, etc.). Unfortunately, current route planning functionality may not provide adequate customization of routing logic used by the route planning functionality. For example, a map application may merely take into account historical and/or measured traffic information when planning a driving route, but may not take into account customized information that may be used to configure the routing logic used by the map application.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Among other things, one or more systems and/or techniques for configuring a route-planning module using one or more configuration plug-ins are provided herein. The route-planning module may be configured to create various types of routes, such as a driving route associated with a traffic map, an internet packet route associated with an internet infrastructure, a vacation activity route (e.g., a vacation plan, such as meals, bed times, rise times, hiking, museum trips, and/or ordering thereof, etc.), and/or a variety of other routes. The route-planning module may be configured using a graph configuration plug-in, an attribute configuration plug-in, and/or a cost configuration plug-in, for example. Such configuration plug-ins may be used to modify routing logic utilized by the route-planning module to create a route from a starting node to a destination node within a graph comprising one or more nodes connected by one or more edges, such as directed edges. For example, a configuration plug-in may modify the graph, modify attributes associated with edges and/or nodes within the graph, and/or modify cost functions used to select edges and/or turns for a route, for example.

In one example of configuring the route-planning module, a graph configuration plug-in may be used to customize a graph utilized by the route-planning module to create a route. In particular, a determination may be made as to whether graph configuration data of the graph configuration plug-in adheres to a graph editing convention (e.g., a syntax check). For example, the graph editing convention may specify a graph representation format that is compatible with the route-planning module (e.g., if the graph configuration data does not adhere to the graph editing convention, then the graph configuration data may be incompatible with the route-planning module). Responsive to the graph configuration data adhering to the graph editing convention, the graph-configuration plug-in may be applied to the graph to create a modified graph. That is, a structure of the graph may be modified based upon graph configuration data specified by the graph configuration plug-in (e.g., a node and/or an edge may be added, removed, and/or modified). For example, one or more street edges associated with a residential attribute may be removed from a map graph based upon the graph configuration data specifying that a truck driver is restricted from driving through residential areas. In this way, the route-planning module may create the route based upon the modified graph.

In another example of configuring the route-planning module, an attribute configuration plug-in may be used to customize a collection of attributes associated with a directed edge within a graph (e.g., the modified graph) utilized by the route-planning module to create the route. In particular, a determination may be made as to whether attribute configuration data of the attribute configuration plug-in adheres to an attribute editing convention (e.g., a syntax check). For example, the attribute editing convention may specify an attribute representation format that is compatible with the route-planning module (e.g., if the attribute configuration data does not adhere to the attribute editing convention, then the attribute configuration data may be incompatible with the route-planning module). Responsive to the attribute configuration data adhering to the attribute editing convention, the attribute configuration plug-in may be applied to the collection of attributes associated with the directed edge to create a modified collection of attributes for the directed edge. That is, the collection of attributes may be modified based upon attribute configuration data specified by the attribute configuration plug-in (e.g., an attribute and/or a value of an attribute may be added, removed, and/or modified). For example, a one-way street attribute may be added to a collection of attributes associated with a street edge based upon the attribute configuration data specifying that a portion of a street represented by the street edge is a one-way street. It may be appreciated that the attribute configuration plug-in may be applied to attributes associated with one or more directed edges and/or one or more nodes within the graph. In this way, the route-planning module may create the route based upon the modified collection of attributes.

In another example of configuring the route-planning module, a cost configuration plug-in may be used to customize costs associated with directed edges and/or turns (e.g., a turn at a node from a first edge to a second edge) within a graph (e.g., the modified graph) utilized by the route-planning module to create the route. In particular, a determination may be made as to whether cost configuration data of the cost configuration plug-in adheres to a cost editing convention (e.g., a syntax check). For example, the cost editing convention may specify a cost function format that is compatible with the route-planning module (e.g., if the cost configuration data does not adhere to the cost editing convention, then the cost configuration data may be incompatible with the route-planning module). In one example, responsive to the cost configuration data adhering to the cost editing convention, the cost configuration plug-in may be applied to a turn cost associated with a node within the graph to create a modified turn cost for the node. That is, cost configuration data specified by (e.g., fed into) the cost configuration plug-in may be applied to attributes associated with a first directed edge and/or a second directed edge connected to the node, resulting in a modified turn cost representing a cost associated with turning from the first directed edge to the second directed edge at the node (e.g., turn cost could be increased if turning from the first directed edge to the second directed edge at the node corresponds to a left hand turn where a user-defined preference, for example, within the cost configuration data is not to make left hand turns). In another example, the cost configuration plug-in may be applied to a collection of attributes associated with a directed edge within the graph to create a modified edge cost for the directed edge. That is, a modified edge cost may be determined by applying cost configuration data specified by the cost configuration plug-in to the collection of attributes for the directed edge (e.g., an inner product may be calculated for numerical values associated with the cost configuration data and/or the attributes). In this way, the route-planning module may create the route based upon one or more modified turn costs for nodes and/or one or more modified edge costs for directed edges. The route-planning module may take such costs into consideration when planning the route, such as a low cost route, for example.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DESCRIPTION OF THE DRAWINGS

FIG. 2 is a flow diagram illustrating an exemplary method of configuring a route-planning module with a cost configuration plug-in.

DETAILED DESCRIPTION

Figure 1:
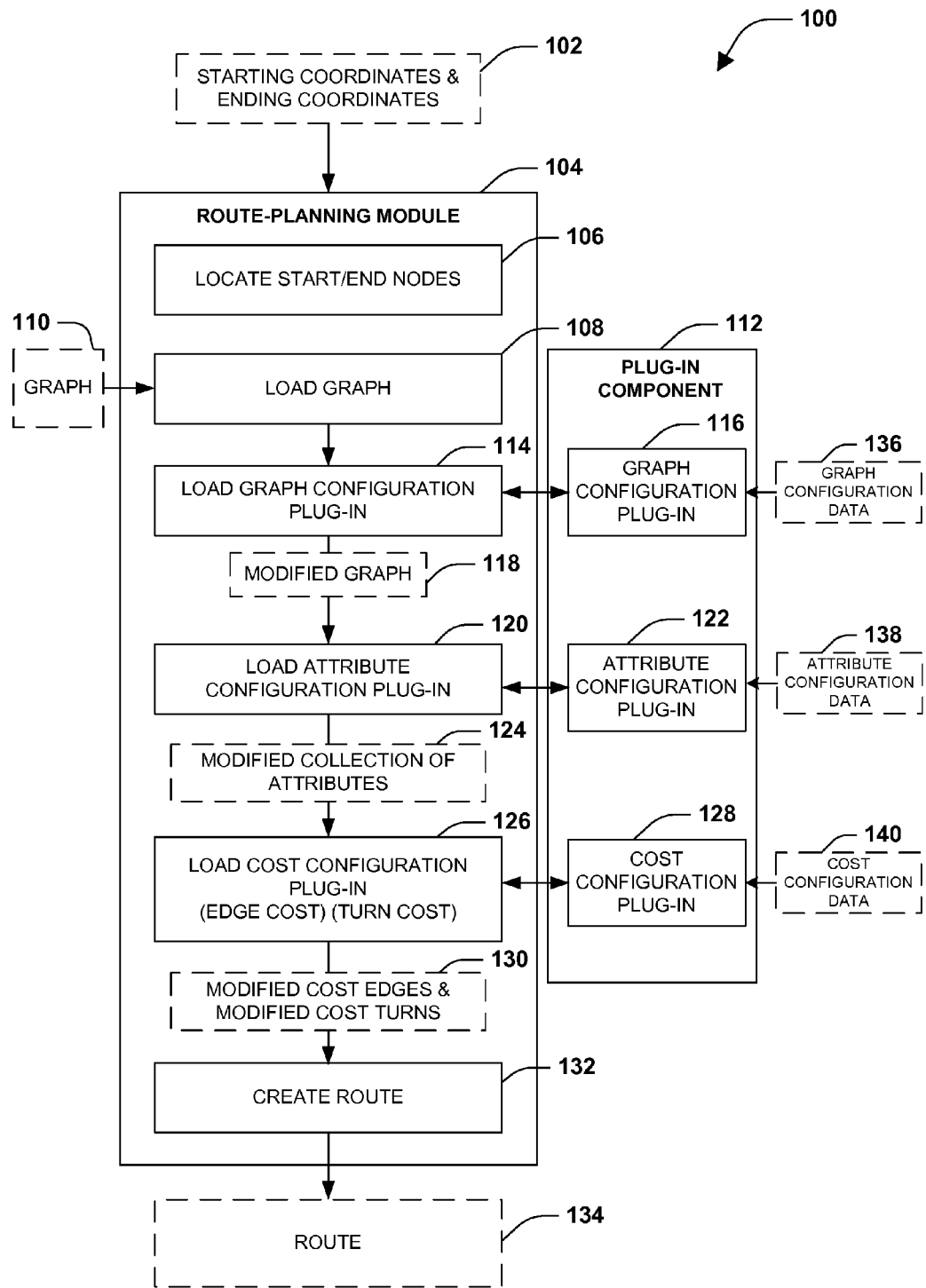
FIG. 1 is a component block diagram illustrating an exemplary system for customizing a route-planning module with one or more configuration plug-ins.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

A route-planning module may be configured to create various types of routes, such as a traffic route, an internet packet route, a social planning route (e.g., a route, plan, sequence, ordering, etc. of activities to do during a vacation), and/or other types of routes. The route-planning module may create the route based upon a graph. The graph may comprise one or more nodes connected by edges, such as directed edges. For example, a traffic graph may comprise one or more intersection nodes representing intersections connected by street edges representing streets or portions thereof. In this way, the route-planning module may create a route from a starting node to a destination node within the graph by assigning and/or evaluating costs associated with edges and/or nodes. A cost may be derived from attributes associated with edges and/or nodes (e.g., a relatively high cost may be assigned to a street edge associated with a 25 MPH attribute, while a relatively low cost may be assigned to a street edge associated with a 45 MPH attribute). Unfortunately, current route-planning modules may not provide a pluggable architecture for configuration plug-ins that may otherwise customize route planning logic utilized by route-planning modules.

Accordingly, one or more systems and/or techniques for configuring a route-planning module are provided herein. In one example, a graph used by a route-planning module to create a route, plan, etc. may be modified by a graph configuration plug-in (e.g., edges and/or nodes may be added, removed, and/or modified within the graph). In another example, a collection of attributes associated with a directed edge within the graph may be modified by an attribute configuration plug-in (e.g., attributes and/or values of attributes may be added, removed, and/or modified for the directed edge). The attribute configuration plug-in may be configured to modify attributes associated with directed edges and/or nodes within the graph. In another example, an edge cost associated with a directed edge may be modified by a cost configuration plug-in (e.g., the edge cost of the directed edge may be increased based upon the directed edge being associated with an undesirable attribute). In another example, a turn cost associated with turning from a first directed edge to a second directed edge at a node may be modified based the cost configuration plug-in. In this way, the route-planning module may be configured based upon one or more configuration plug-ins.

It may be appreciated that the route-planning module may be used to plan various types of routes, where a route may represent a sequence of abstract points, events, nodes, etc. that may be distributed in space and/or time (e.g., with relative and/or absolute spatial and/or temporal attributes, aspects, etc.). In one example, an application installation module may plan a route (e.g., a sequence of application components, such as subcomponents and/or prerequisites) for installation of a software application. In another example, a building construction module may plan a building construction route (e.g., a sequence of building components, tasks, projects, sub-projects, etc. that are to be installed, performed, etc. to create a building). In another example, a database query module may construct a query route (e.g., an algebraic formula to mitigate query time to a database). In this way, the route-planning module may determine a desired (e.g., optimized, low cost, short, etc.) sequence of abstract points as the route.

FIG. 1 illustrates an example of a system 100 configured for customizing a route-planning module 104 with one or more configuration plug-ins. The route-planning module 104 may comprise a traffic routing module, a social event planning module, a social network module, an internet traffic routing module, and/or a variety of other routing modules.

The route-planning module 104 may be configured to create 132 a route 134 based upon starting coordinates and/or ending coordinates (e.g., coordinates 102) associated with a graph 110. The graph 110 may comprise one or more nodes connected by one or more directed edges (e.g., a traffic graph may comprise one or more intersection nodes representing street intersections connected by one or more street edges representing streets or portions thereof). In one example, a node may correspond to a node ID and/or a set of attributes (e.g., an intersection node may comprise a stop light attribute, a gas station attribute, a restroom stop attribute, and/or a variety of attributes that may be associated with an intersection). A directed edge may correspond to a set of nodes, such as a starting node and/or a terminating node, associated with the directed edge and/or collection of attributes (e.g., a one-way street attribute, a restroom stop attribute, a speed limit attribute, etc.). The route-planning module 104 may locate 106 a starting node and/or an ending node for the route 134 based upon the coordinates 102.

The route-planning module 104 may be configured to load 108 the graph 110. For example, the coordinates 102 may be associated with a map. The route-planning module 104 may identify the graph 110 for loading based upon a determination that the graph 110 represents the map (e.g., the graph 110 may comprise the starting node and/or the ending node associated with the coordinates 102). It may be advantageous to customize route planning logic used by the route-planning module 104 to create 132 the route 134. In one example, a trucking company may desire to modify the route planning logic to avoid left turns and/or take into account a truck clearance height of 15 feet for overpasses. In another example, a family planning a vacation may desire to modify the route planning logic to take into account restroom stops, sightseeing locations, and/or shopping boutiques.

Accordingly, the system 100 may comprise a plug-in component 112 configured to apply one or more configuration plug-ins to the route-planning module 104. Because various users (e.g., an individual, a trucking company, a vacation planning company, an IT administrator, social event planner, etc.) may create configuration plug-ins, the plug-in component 112 may be configured to determine whether data of a configuration plug-in adheres to an editing convention (e.g., a graph editing convention, an attribute editing convention, and/or a cost editing convention, etc.). The editing convention may specify a format (e.g., a syntax) that is compatible with the route-planning module 104 (e.g., a format for representing graphs, attributes, and/or cost functions). Responsive to the data of a configuration plug-in not adhering to an editing convention, the configuration plug-in may be restricted from accessing the route-planning module 104.

In one example of applying a configuration plug-in, the plug-in component 112 may be configured to determine whether graph configuration data 136 of a graph configuration plug-in 116 adheres to a graph editing convention (e.g., a format for representing graphs). Responsive to the graph configuration data 136 of the graph configuration plug-in 116 adhering to the graph editing convention, the plug-in component 112 may load 114 the graph configuration plug-in 116. That is, the plug-in component 112 may apply the graph configuration plug-in 116 to the graph 110 to create a modified graph 118. In particular, the graph configuration plug-in 116 may modify a structure of the graph 110 based upon graph configuration data 136 (e.g., directed edge and/or nodes may be removed, added, and/or modified within the graph 110). In one example, the graph configuration data 136 may be extracted from a source external to the route-planning module 104 (e.g., a geographic survey company may provide updated information regarding a new highway to the graph configuration plug-in 116).

In one example of creating the modified graph 118, the graph configuration plug-in 116 may comprise graph configuration data 136 specifying that a truck is restricted from traveling in residential areas and/or that a new highway has been opened. The graph configuration plug-in 116 may remove one or more nodes and/or directed edges associated with a residential attribute from the graph 110 and/or may add one or more nodes and/or directed edges associated with the new highway to the graph 110. In this way, the route-planning module 104 may utilize the modified graph 118 in creating 132 the route 134.

In another example of applying a configuration plug-in, the plug-in component 112 may be configured to determine whether attribute configuration data 138 of an attribute configuration plug-in 122 adheres to an attribute editing convention (e.g., a format for representing attributes). Responsive to the attribute configuration data 138 of the attribute configuration plug-in 122 adhering to the attribute editing convention, the plug-in component 112 may load 120 the attribute configuration plug-in 122. That is, the plug-in component 112 may apply the attribute configuration plug-in 122 to a collection of attributes associated with a directed edge (e.g., within the modified graph 118) to create a modified collection of attributes 124 for the directed edge. In particular, the attribute configuration plug-in 122 may modify the collection of attributes based upon attribute configuration data 138 specified by the attribute configuration plug-in 122 (e.g., add a new attribute, remove an attribute, modify an attribute, and/or modify a value of an attribute). It may be appreciated that the attribute configuration plug-in 122 may be configured to modify attributes associated with one or more directed edges and/or one or more nodes (e.g., within the modified graph 118).

In one example of creating the modified collection of attributes 124, the attribute configuration plug-in 122 may comprise attribute configuration data 138 specifying that restrooms and/or breakfast locations are desired. The attribute configuration plug-in 122 may add a restroom attribute and/or a breakfast restaurant attribute to collections of attributes associated with respective directed edges and/or nodes (e.g., within the modified graph 118). In one example, the attribute configuration plug-in 122 may add, remove, and/or modify values for such attributes. In this way, the route-planning module 104 may utilize the modified collection of attributes 124 when creating 132 the route 134.

In another example of applying a configuration plug-in, the plug-in component 112 may be configured to determine whether cost configuration data 140 of a cost configuration plug-in 128 adheres to a cost editing convention (e.g., a format for representing cost functions). Responsive to the cost configuration data 140 of the cost configuration plug-in 128 adhering to the cost editing convention, the plug-in component 112 may load 126 the cost configuration plug-in 128. It may be appreciated that the cost configuration plug-in 128 may be applied to edge costs associated with directed edges (e.g., a cost to travel a street or portion thereof) and/or turn costs associated with nodes (e.g., a cost to turn from a first street to a second street at an intersection).

In one example of applying the cost configuration plug-in 128 to a directed edge, the plug-in component 112 may apply the cost configuration plug-in 128 to the modified collection of attributes 124 associated with the directed edge to create a modified edge cost (e.g., modified cost 130) for the directed edge. In particular, cost configuration data 140 of (e.g., weights that may be applied to attributes) specified by the cost configuration plug-in 128 may be applied to the modified collection of attributes 124 of the directed edge to create the modified edge cost (e.g., an inner product may be calculated between the modified collection of attributes 124 and the cost configuration data 140 to create the modified edge cost). In one example of creating the modified edge cost, the cost configuration data 140 of the cost configuration plug-in 128 may comprise a user-defined preference specifying that a truck is unable to pass under overpasses lower than 15 feet. The cost configuration plug-in 128 may apply a relatively high cost to overpass attributes that are lower than 15 feet, thus resulting in a relatively high cost for nodes and/or direct edges having an overpass attribute lower than 15 feet (e.g., other relatively low costing nodes and/or directed edges may be selected over such relatively high costing nodes and/or directed edges for inclusion within the route 134).

In one example of applying the cost configuration plug-in 128 to a turn cost, the plug-in component 112 may apply the cost configuration plug-in 128 to a turn cost associated with a node (e.g., within the modified graph 118) to create a modified turn cost (e.g., modified cost 130) for the node. In particular, cost configuration data 140 (e.g., weights that may be applied to attributes) specified by the cost configuration plug-in 128 may be applied to the turn cost associated for the node to create the modified turn cost (e.g., weights from the cost configuration data 140 of may be applied to attributes associated with the node, a first edge, and/or a second edge associated with the turn, which may be used to determine, such as through an inner product, the modified turn cost). In one example of creating the modified turn cost, the cost configuration data 140 of the cost configuration plug-in 128 may comprise a user-defined preference specifying that roads with speed limits above 40 MPH are desired. The cost configuration plug-in 128 may apply a relatively low cost to a turn cost associated with turning from a first street edge having a 25 MPH speed limit to a second street edge having a 50 MPH speed limit at an intersection node. In this way, the route-planning module 104 may utilize the modified costs 130 when creating 132 the route 134.

Figure 2:
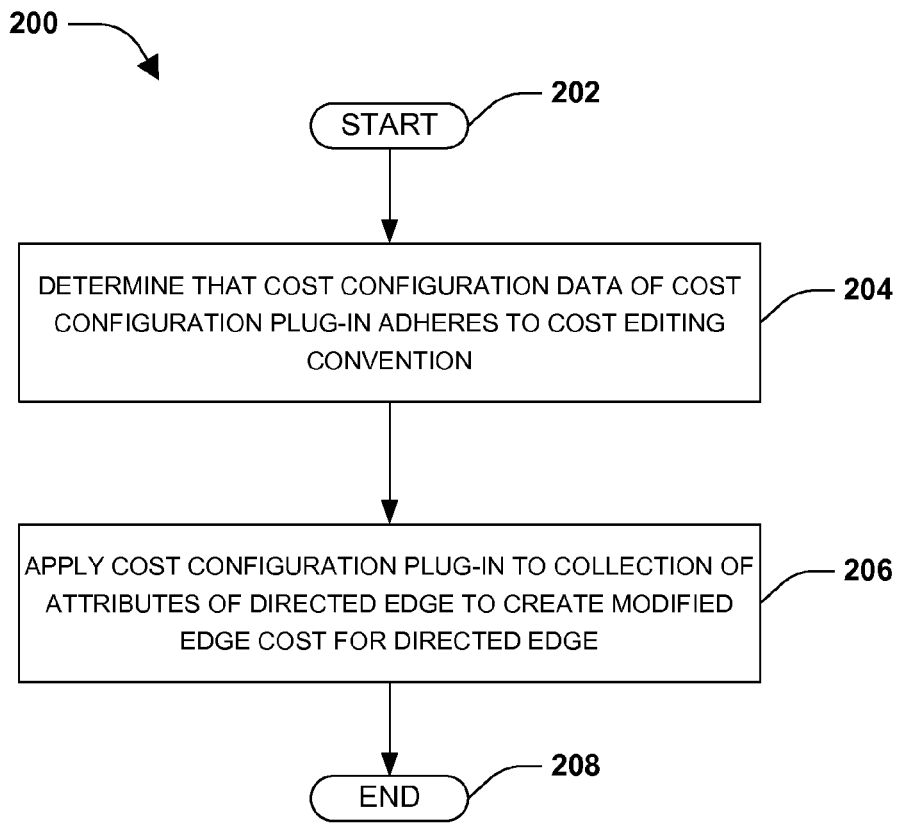

One embodiment of configuring a route-planning module with a cost configuration plug-in is illustrated by an exemplary method 200 in FIG. 2. At 202, the method starts. A route-planning module may be configured to create a route within a graph. The graph may comprise one or more nodes connected by one or more directed edges. The cost configuration plug-in may be configured to modify an edge cost associated with a directed edge within the graph. The edge cost may represent a cost associated with traveling the directed edge within the route. The edge cost may be a function of costs associated with attributes for the directed edge (e.g., the edge cost may be a function of a relatively high cost associated with a construction zone attribute, a relatively high cost associated with a 25 MPH speed limit attribute, and/or a relatively low cost associated with a two-way street attribute). The route-planning module may take into account edge costs associated with directed edges within the graph when determining the route. For example, the route may be created based upon a low cost edge from a starting node to a destination node within the graph. Accordingly, the cost configuration plug-in may modify an edge cost based upon cost configuration data (e.g., an edge cost of a street edge associated with a construction zone attribute may be increased based upon the cost configuration data comprising a user-defined preference to avoid construction zones).

At 204, a determination may be made as to whether cost configuration data of the cost configuration plug-in adheres to a cost editing convention. For example, the cost editing convention may be used to determine whether cost configuration data of the cost configuration plug-in represents information, such as a cost function, in a format that is compatible with the route-planning module. At 206, responsive to the cost configuration data of the cost configuration plug-in adhering to the cost editing convention, the cost configuration plug-in may be applied to a collection of attributes associated with the directed edge within the graph to create a modified edge cost for the directed edge. In particular, cost configuration data (e.g., weights that may be applied to attributes of the directed edge) specified by the cost configuration plug-in may be applied to the collection of attributes. For example, an inner product may be calculated between the collection of attributes and the cost configuration data (e.g., which may comprise user-defined preferences) to create the modified edge cost.

In one example, the cost configuration plug-in may be configured to modify a turn cost associated with turning from a first directed edge to a second directed edge at a node (e.g., a cost to turn from a first street edge to a second street edge at an intersection node). The cost configuration data of the cost configuration plug-in may be applied to the turn cost for the node to create a modified turn cost. In particular, cost configuration data (e.g., weights that may be applied to attributes of the node, the first directed edge, and/or the second directed edge) specified by the cost configuration plug-in may be applied to the turn cost. For example, the cost configuration data (e.g., which may comprise user-defined preferences) may be applied to attributes associated with the node, the first directed edge, and/or the second directed edge. In this way, the route-planning module may take into account one or more modified edge costs and/or one or more modified turn costs when creating the route. At 208, the method ends.

Figure 3:
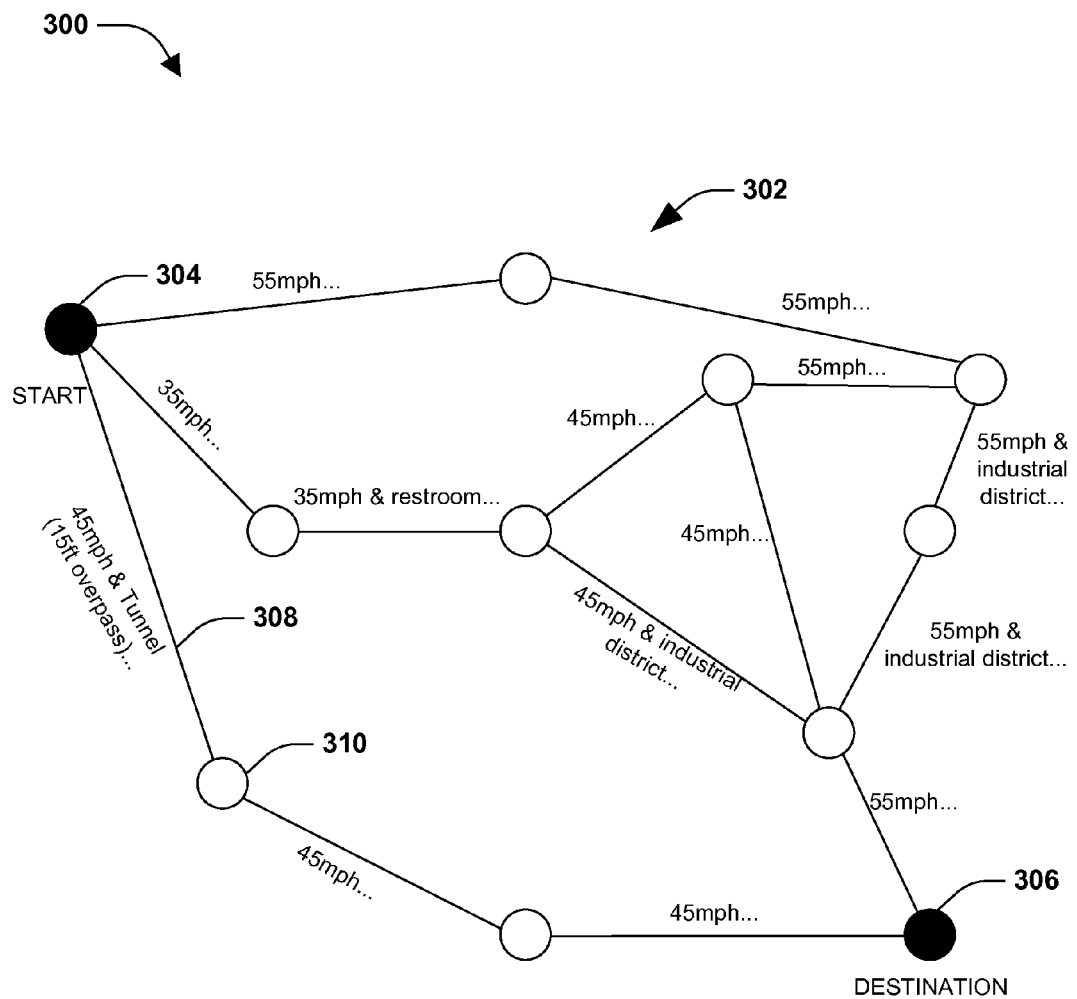
FIG. 3 is an illustration of an example of a traffic graph comprising intersection nodes connected by street edges.
Figure 3:
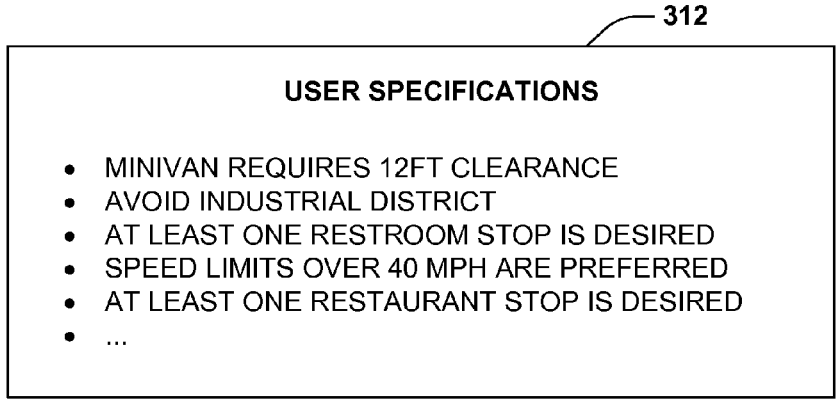

FIG. 3 illustrates an example 300 of a traffic graph 302 comprising intersection nodes connected by street edges. A route-planning module (e.g., a traffic route-planning module associated with a mapping application) may be configured to create a route (e.g., driving directions) from a starting location to a destination location. A map comprising the starting location and the destination location may be represented by the traffic graph 302. The traffic graph 302 may comprise one or more intersection nodes, such as a starting intersection node 304, a destination intersection node 306, an intersection node 310, and/or other intersection nodes. An intersection node may correspond to a node ID, a set of attributes for the intersection node, and/or one or more street edges associated with the intersection node (e.g., a street edge originating at the intersection node, a street edge terminating at the intersection node, etc.). For example, the intersection node 310 may correspond to a 15 foot overpass attribute, a tunnel attribute, a 45 MPH speed limit attribute, and/or other attributes.

The traffic graph 302 may comprise one or more street edges, such as a street edge 308 and/or other street edges. A street edge may correspond to one or more intersection nodes (e.g., the street edge 308 may correspond to the starting intersection node 304 and/or the intersection node 310 with which the street edge 308 is connected) and/or a collection of attributes. For example, street edge 308 may correspond to a 15 foot overpass attribute, a tunnel attribute, a 45 MPH speed limit attribute, and/or other attributes not illustrated. It may be appreciated that example 300 merely illustrates one or more attributes associated with street edges, and that other attributes not illustrated may be associated with street edges and/or intersection nodes (e.g., and that applications other than streets and/or intersections are contemplated herein and thus to be included within the scope of the appended claims).

A user may specify user specifications 312 for the route. For example, a vacation planner may desire to take a trip in a minivan. The vacation planner may specify within the user specifications 312 that the driver is driving a minivan requiring a 12 foot clearance, that industrial districts are to be avoided, that at least one restroom stop is desired, that speed limits over 40 MPH are preferred, that at least one restaurant stop is desired, etc. Accordingly, one or more configuration plug-ins (e.g., which may be associated with configuration data that may comprise at least some of the user specifications 312) may be utilized to modify the graph 302, attributes associated with street edges and/or intersection nodes, and/or costs associated with street edges and/or turns. In this way, the route-planning module may plan the route based upon the user specifications 312.

Figure 4:
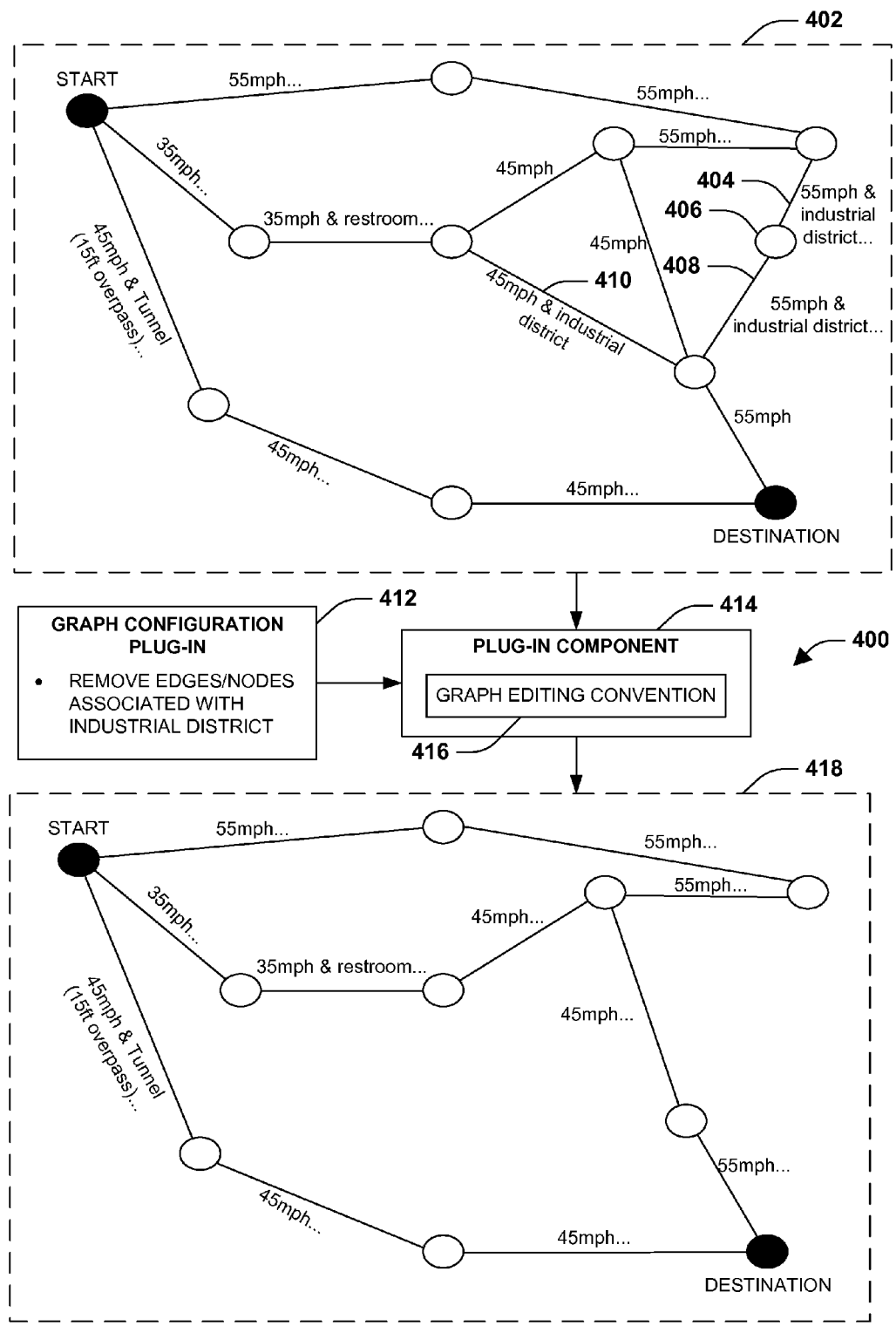
FIG. 4 is an illustration of an example of a graph configuration plug-in modifying a traffic graph to create a modified traffic graph.

FIG. 4 illustrates an example 400 of a graph configuration plug-in 412 modifying a traffic graph 402 to create a modified traffic graph 418. A route-planning module may be configured to create a route from a starting node to a destination node within the traffic graph 402. A plug-in component 414 may be configured to apply the graph configuration plug-in 412 to the traffic graph 402 to create the modified traffic graph 418. In this way, the route-planning module may create the route based upon the modified traffic graph 418, which may reflect graph configuration data representing user specifications for the route, for example.

In one example, the graph configuration plug-in 412 may comprise graph configuration data specifying that a driver desires to avoid industrial districts. The plug-in component 414 may be configured to determine whether graph configuration data of the graph configuration plug-in 412 adheres to a graph editing convention 416. Responsive to the graph configuration data of the graph configuration plug-in 412 adhering to the graph editing convention 416, the plug-in component 414 may be configured to apply the graph configuration plug-in 412 to the traffic graph 402 to create the modified graph 418. For example, the graph configuration plug-in 412 may remove one or more street edges and/or one or more intersection nodes within the traffic graph 402 that correspond to an industrial district attribute (e.g., a first street edge 404, a first intersection node 406, a second street edge 408, and/or a third street edge 410). In this way, the modified traffic graph 418 (e.g., without street edges and/or intersection nodes having an industrial district attribute) may be used by the route-planning module to create the route from the starting node to the destination node, while mitigating the use of industrial districts.

Figure 5:
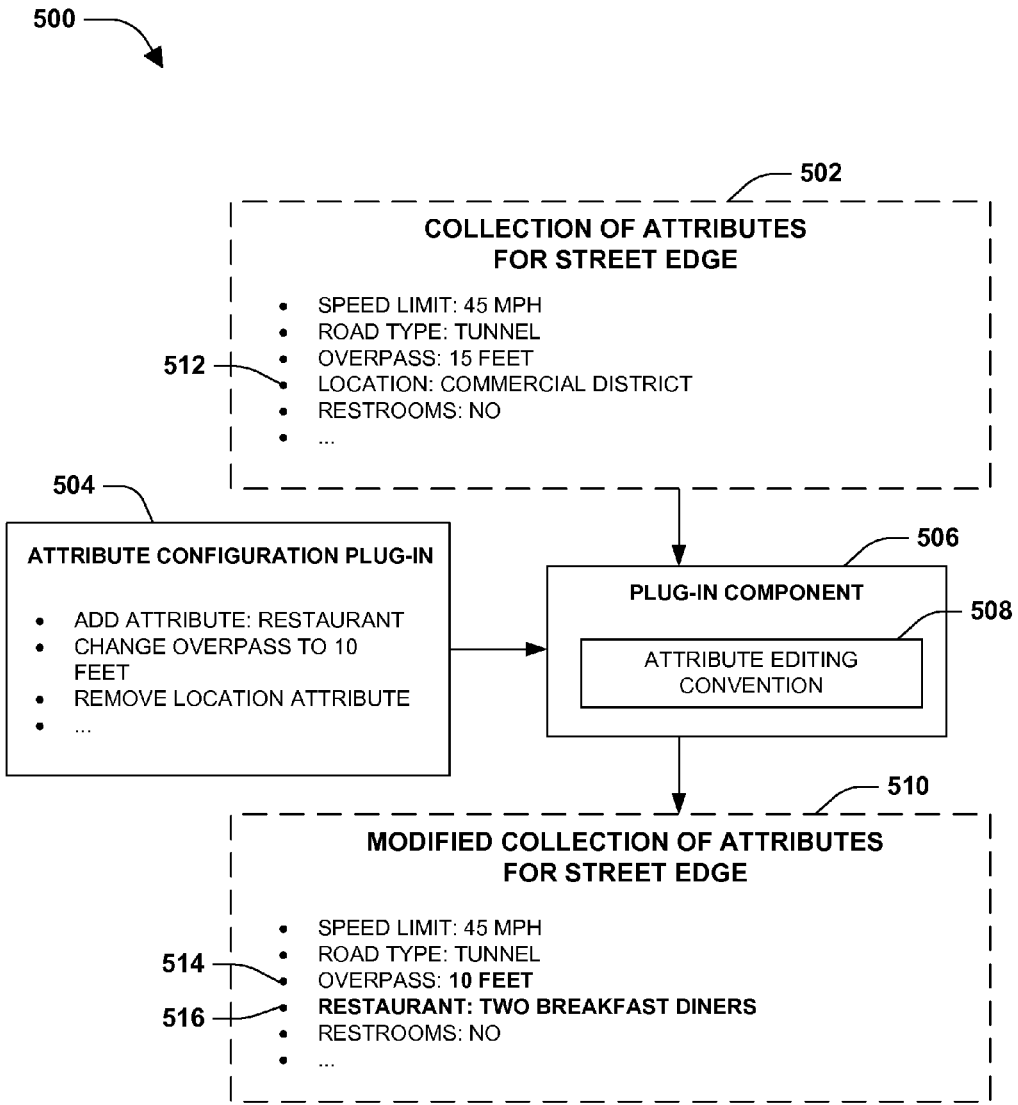
FIG. 5 is an illustration of an example of an attribute configuration plug-in modifying a collection of attributes for a street edge within a traffic graph to create a modified collection of attributes for the street edge.

FIG. 5 illustrates an example 500 of an attribute configuration plug-in 504 modifying a collection of attributes 502 for a street edge within a traffic graph to create a modified collection of attributes 510 for the street edge. The traffic graph may comprise one or more intersection nodes connected by one or more street edges (e.g., representing streets or portions thereof). A route-planning module may be configured to create a route from a starting intersection node to a destination intersection node within the traffic graph. The route-planning module may take into account attributes associated with street edges and/or intersection nodes within the traffic graph. A plug-in component 506 may be configured to apply the attribute configuration plug-in 504 to a collection of attributes (e.g., the collection of attributes 502 for a street edge, a collection of attributes for an intersection node, etc.) to create a modified collection of attributes (e.g., the modified collection of attributes 510 for the street edge, a modified collection of attributes for the intersection node, etc.). In this way, the route-planning module may create the route based upon the modified collection of attributes 510, which may reflect attribute configuration data representing user specifications for the route and/or updated attribute information.

In one example, the attribute configuration plug-in 504 may comprise attribute configuration data specifying that a restaurant attribute is to be added to the collection of attributes 502, that an overpass attribute for the street edge has been changed to 10 feet, that a location attribute is to be removed, etc. For example, the attribute configuration data may be based upon information specifying that a driver desires to stop at a restaurant while traveling and that the driver does not have a preference with regard to the type of location that will be traveled (e.g., industrial, commercial, residential, etc.). The attribute configuration data may also be based upon geographic survey information specifying that an overpass along a portion of a street represented by the street edge is 10 feet as opposed to 15 feet.

The plug-in component 506 may be configured to determine whether attribute configuration data of the attribute configuration plug-in 504 adheres to an attribute editing convention 508. Responsive to the attribute configuration data of the attribute configuration plug-in 504 adhering to the attribute editing convention 508, the plug-in component 506 may be configured to apply the attribute configuration plug-in 504 to the collection of attributes 502 for the street edge to create the modified collection of attributes 510 for the street edge. For example, the attribute configuration plug-in 504 may remove a location attribute 512, modify a value of an overpass attribute 514 from 15 feet to 10 feet, and/or add a new restaurant attribute 516 with a value of two breakfast diners to create the modified collection of attributes 510. In this way, the route-planning module may take the modified collection of attributes 510 into account when creating the route.

Figure 6:
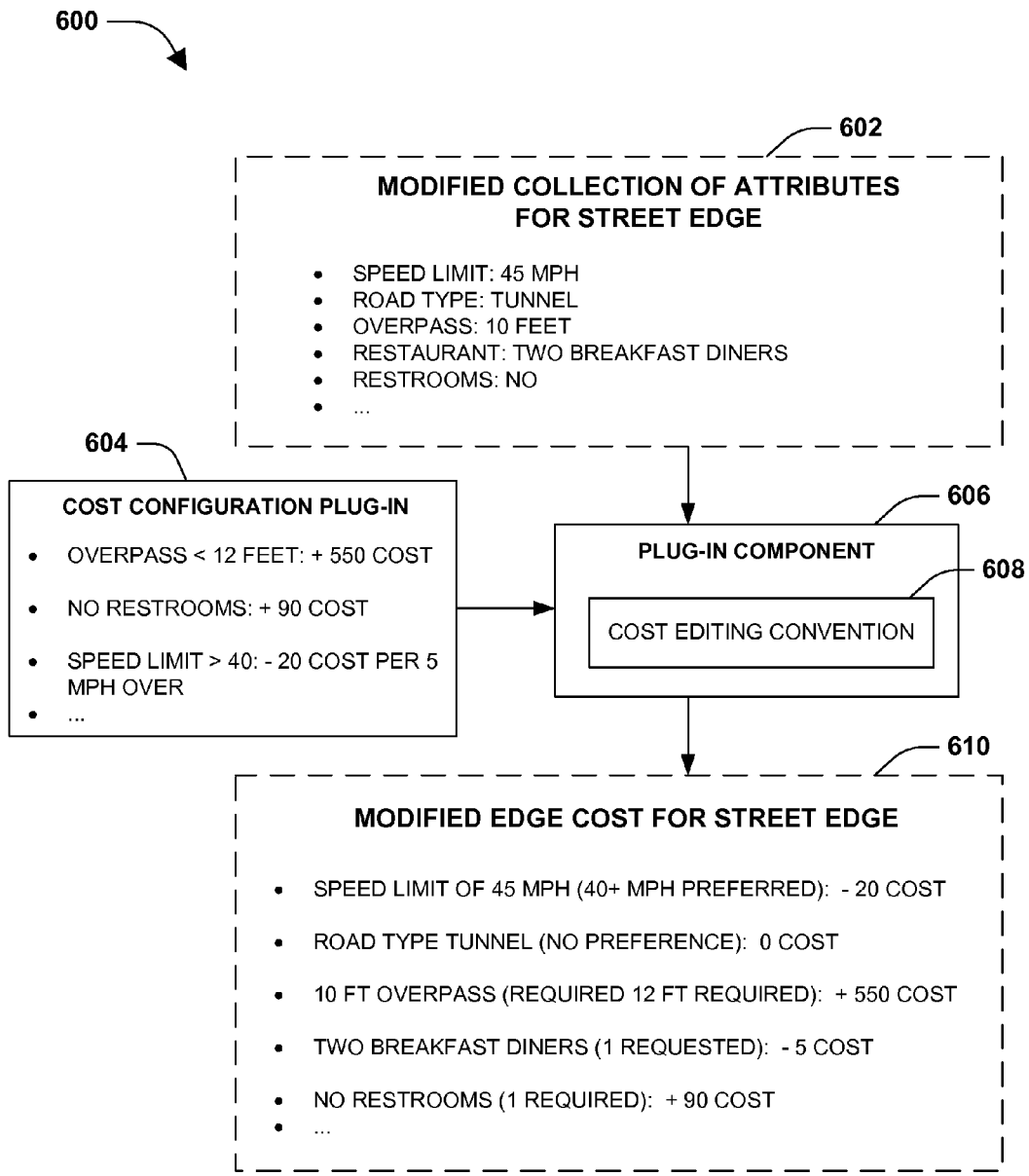
FIG. 6 is an illustration of an example of a cost configuration plug-in modifying an edge cost associated with a street edge within a traffic graph to create a modified edge cost for the street edge.

FIG. 6 illustrates an example 600 of a cost configuration plug-in 604 modifying an edge cost associated with a street edge within a traffic graph to create a modified edge cost 610 for the street edge. The traffic graph may comprise one or more intersection nodes connected by one or more street edges (e.g., representing streets or portions thereof). A route-planning module may be configured to create a route from a starting intersection node to a destination intersection node within the traffic graph. The route-planning module may take into account attributes associated with street edges and/or intersection nodes within the traffic graph. In particular, the route-planning module may assignedge costs to street edges and/or turn costs to intersection nodes within the traffic graph. An edge cost for a street edge may represent a cost associated with including the street edge within the route (e.g., which may be determined based upon evaluating attributes associated with the street edge). A turn cost for an intersection node may represent a cost associated with turning from a first street edge onto a second street edge at the intersection node within the route (e.g., which may be determine based upon evaluating attributes associated with the first street edge, the second street edge, and/or the intersection node).

A plug-in component 606 may be configured to apply the cost configuration plug-in 604 to the edge cost for the street edge (e.g., an edge cost derived from a modified collection of attributes 602 for the street edge) to create the modified edge cost 610 for the street edge. In this way, the modified edge cost 610 may reflect cost configuration data (e.g., the modified edge cost 610 may comprise an increased value based upon the street edge being associated with an attribute that is undesirable to a user as specified by a user-defined preference within the cost configuration data).

In one example, the cost configuration plug-in 604 may comprise cost configuration data that comprises one or more user-defined preferences specifying that street edges corresponding to an overpass attribute having a value smaller than 12 feet are undesirable (e.g., and are to be assigned a +500 cost because a driver may be unable to drive under such an overpass), that street edges corresponding to a restroom attribute having a value of 0 are undesirable (e.g., and are to be assigned a +90 cost because a driver may desire to stop at a restroom during the trip), and/or that street edges corresponding to a speed limit attribute having a value greater than 40 MPH are desirable (e.g., and are to be assigned a −20 cost per 5 MPH over 40 MPH).

The plug-in component 606 may be configured to determine whether cost configuration data of the cost configuration plug-in 604 adheres to a cost editing convention 608. Responsive to the cost configuration data of the cost configuration plug-in 604 adhering to the cost editing convention 608, the plug-in component 606 may be configured to apply the cost configuration plug-in 604 to the edge cost for the street edge to create the modified edge cost 610 for the street edge. In particular, the cost configuration plug-in may apply weights associated with the cost configuration data (e.g., which may comprise user-defined preferences) to the modified collection of attributes 602. For example, the cost configuration plug-in 604 may assign a −20 cost to the speed limit attribute because the speed limit attribute may comprise a value of 45 MPH (e.g., 5 MPH over the desired 40 MPH). The cost configuration plug-in 604 may assign a +550 cost to the overpass attribute because the overpass attribute may comprise a value of 10 feet (e.g., 2 feet below the desired 12 feet overpass height). The cost configuration plug-in 604 may assign a +90 cost to the restroom attribute because the restroom attribute may comprise a value of 0 (e.g., 1 less restroom than desired). It may be appreciated that other costs may be assigned to other attributes. The costs assigned to the attributes may be used to create the modified edge cost 610 (e.g., the costs may be summed together to create a value for the modified edge cost 610). In this way, the route-planning module may take the modified edge cost 610 into account when creating the route.

Figure 7:
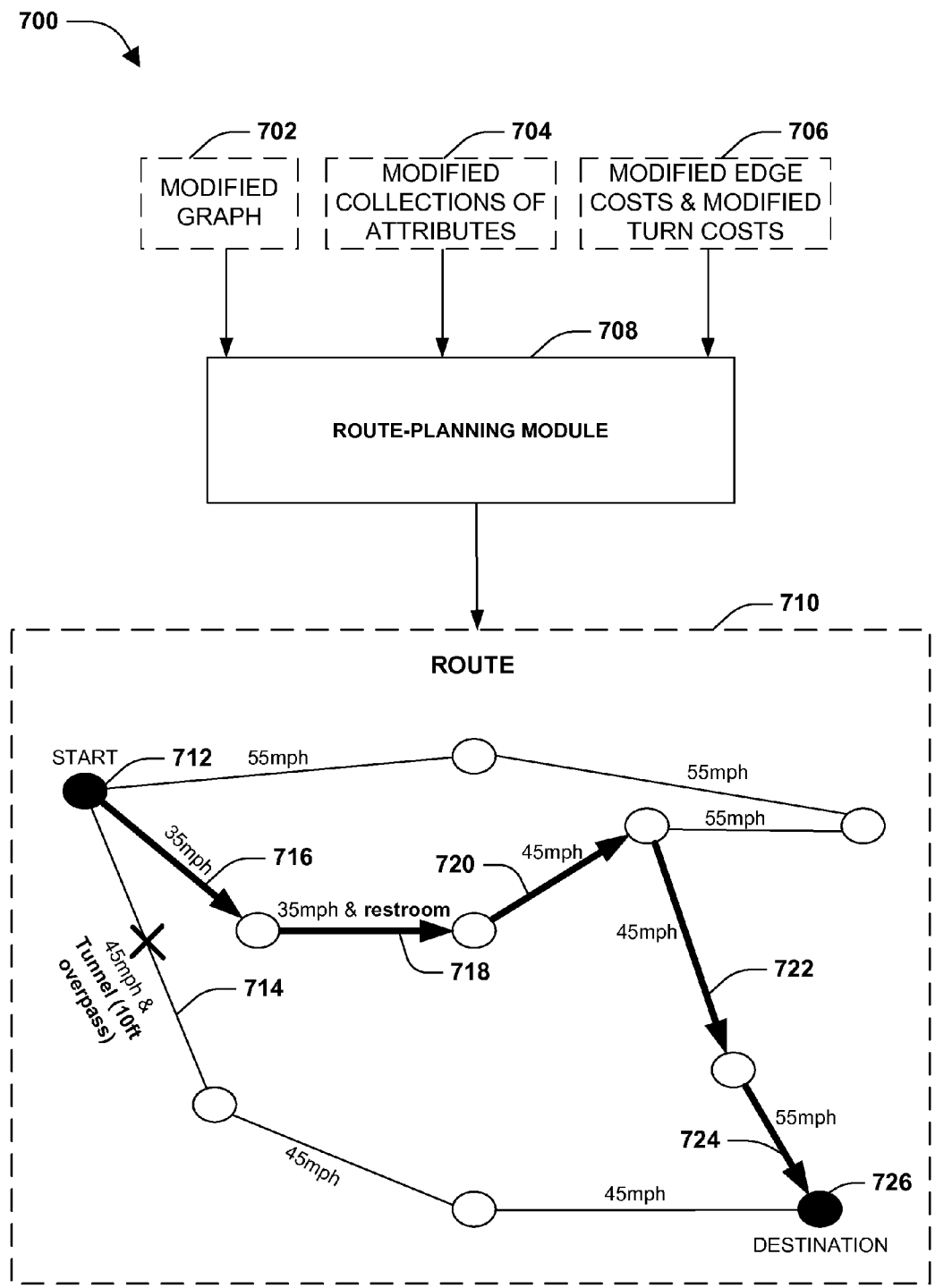
FIG. 7 is an illustration of a route-planning module creating a route within a modified graph based upon modified collections of attributes and/or modified costs associated with directed edges and/or turns.

FIG. 7 illustrates an example 700 of a route-planning module 708 creating a route 710 within a modified graph 702 based upon modified collections of attributes 704 and/or modified costs 706 associated with directed edges and/or turns. The route-planning module 708 may be configured to create the route 710 from a starting location represented by a starting node 712 to a destination location represented by a destination node 726 within the modified graph 702. The route-planning module 708 may evaluate costs associated with directed edges, nodes, and/or turns when creating the route 710. In one example, the route-planning module 708 may create the route 710 using a least cost approach. For example, the route 710 may comprise the starting node 712, a first directed edge 716, a second directed edge 718 (e.g., because the second directed edge 718 comprises a restroom stop desired by a user), a third directed edge 720, a fourth directed edge 722, a fifth directed edge 724, the destination node 726, and/or other nodes there between. In one example, the route 710 may not comprise a sixth directed edge 714 because the sixth directed edge 714 may comprise a relatively high cost based upon an overpass attribute for the sixth directed edge 714 comprising a 10 foot overpass (e.g., which may be assigned a high cost based upon a user desiring an overpass greater than 13 feet).

The route-planning module 708 may create the route 710 based upon the modified graph 702, which may have been created by a graph configuration plug-in (e.g., the graph configuration plug-in may have added, removed, and/or modified nodes and/or directed edges within a graph to create the modified graph 702 based upon graph configuration data). The route-planning module 708 may take into account the modified collections of attributes 704, which may have been created by an attribute configuration plug-in (e.g., the attribute configuration plug-in may have added, removed, and/or modified attributes associated with directed edges and/or nodes based upon attribute configuration data). The route-planning module 708 may take into account modified directed edge costs and/or modified turn costs, which may have been created by a cost configuration plug-in (e.g., the cost configuration plug-in may have modified costs associated with directed edges and/or turns based upon cost configuration data, which may comprise user-defined preferences). In this way, the route-planning module 708 may create the route 710 based upon customization provided by one or more configuration plug-ins.

It may be appreciated that while examples herein pertain to traffic routes, such as travelling on roadways, the instant application including the scope of the appended claims is not intended to be so limited. That is, a route is not limited to the context of a road, but instead may comprise or correspond to any arrangement of points, events, nodes, etc. that may be distributed in space and/or time. For example, a route may pertain to an order of events associated with installing software, a computer program and/or the like, an order of completing tasks associated with a construction project, an order or sequence of events performed as part of a vacation plan, etc. That is, planning, creating, etc. a route, etc. as provided herein (e.g., using a route-planning module) is not limited to a road, street, etc. context.

Figure 8:
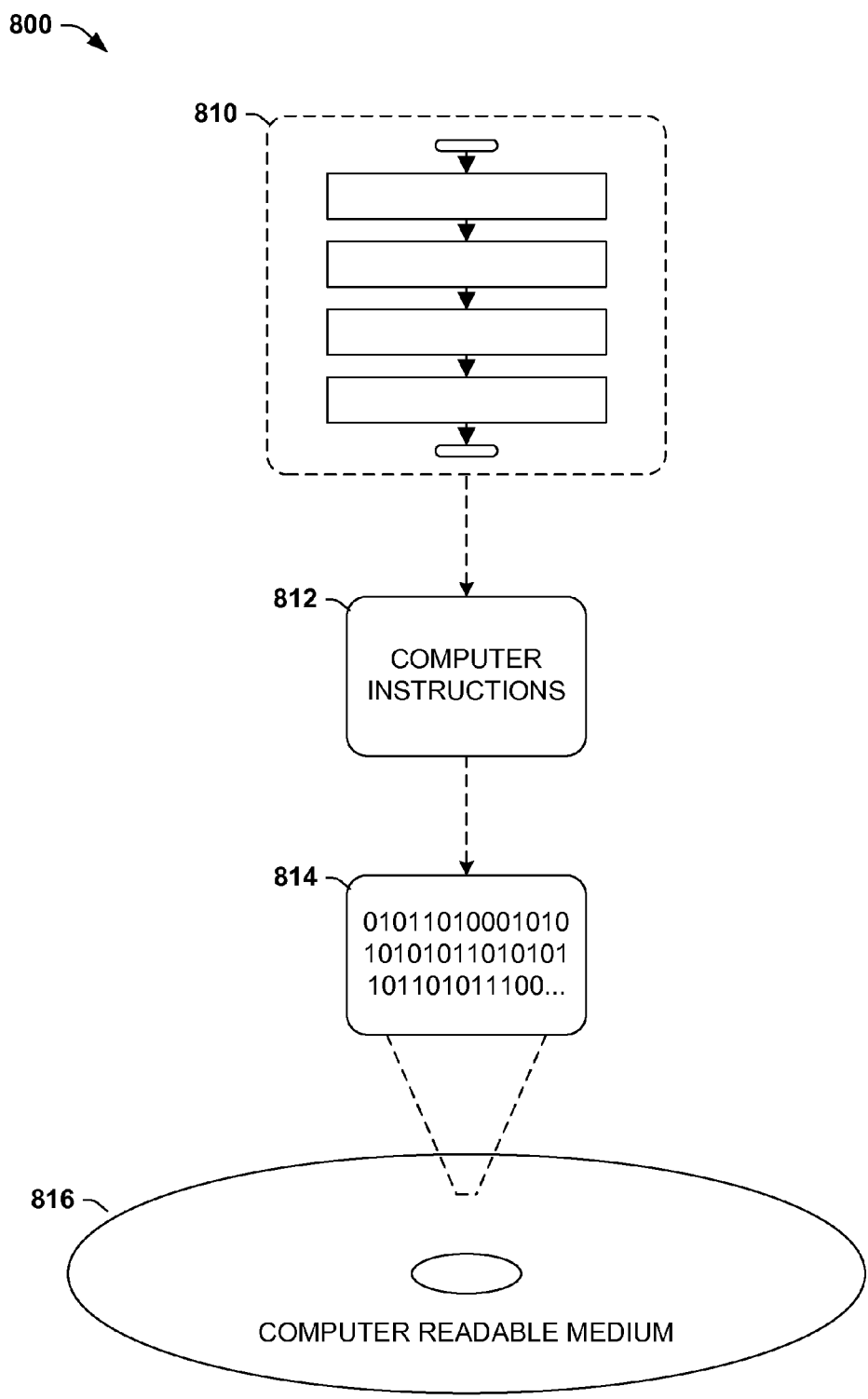
FIG. 8 is an illustration of an exemplary computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium that may be devised in these ways is illustrated in FIG. 8, wherein the implementation 800 comprises a computer-readable medium 816 (e.g., a CD-R, DVD-R, or a platter of a hard disk drive), on which is encoded computer-readable data 814. This computer-readable data 814 in turn comprises a set of computer instructions 812 configured to operate according to one or more of the principles set forth herein. In one such embodiment 800, the processor-executable computer instructions 812 may be configured to perform a method 810, such as at least some of the exemplary method 200 of FIG. 2, for example. In another such embodiment, the processor-executable instructions 812 may be configured to implement a system, such as at least some of the exemplary system 100 of FIG. 1, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 9:
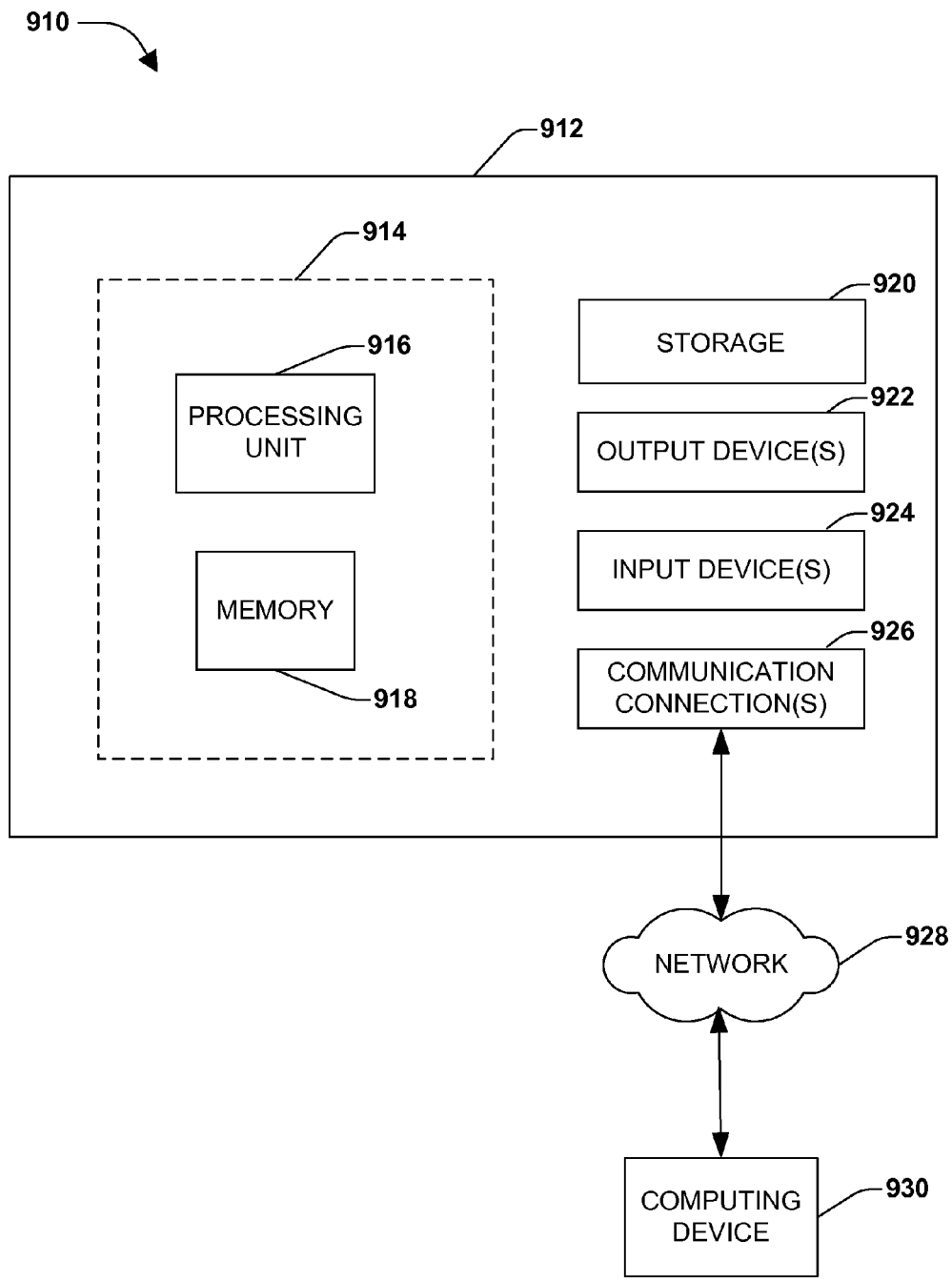
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 910 comprising a computing device 912 configured to implement one or more embodiments provided herein. In one configuration, computing device 912 includes at least one processing unit 916 and memory 918. Depending on the exact configuration and type of computing device, memory 918 may be volatile (such as RAM, for example), non-volatile (such as ROM, flash memory, etc., for example) or some combination of the two. This configuration is illustrated in FIG. 9 by dashed line 914.

In other embodiments, device 912 may include additional features and/or functionality. For example, device 912 may also include additional storage (e.g., removable and/or non-removable) including, but not limited to, magnetic storage, optical storage, and the like. Such additional storage is illustrated in FIG. 9 by storage 920. In one embodiment, computer readable instructions to implement one or more embodiments provided herein may be in storage 920. Storage 920 may also store other computer readable instructions to implement an operating system, an application program, and the like. Computer readable instructions may be loaded in memory 918 for execution by processing unit 916, for example.

The term "computer readable media" as used herein includes computer storage media. Computer storage media includes volatile and nonvolatile, removable and non-removable media implemented in any method or technology for storage of information such as computer readable instructions or other data. Memory 918 and storage 920 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 912. Any such computer storage media may be part of device 912.

Device 912 may also include communication connection(s) 926 that allows device 912 to communicate with other devices. Communication connection(s) 926 may include, but is not limited to, a modem, a Network Interface Card (NIC), an integrated network interface, a radio frequency transmitter/receiver, an infrared port, a USB connection, or other interfaces for connecting computing device 912 to other computing devices. Communication connection(s) 926 may include a wired connection or a wireless connection. Communication connection(s) 926 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 912 may include input device(s) 924 such as keyboard, mouse, pen, voice input device, touch input device, infrared cameras, video input devices, and/or any other input device. Output device(s) 922 such as one or more displays, speakers, printers, and/or any other output device may also be included in device 912. Input device(s) 924 and output device(s) 922 may be connected to device 912 via a wired connection, wireless connection, or any combination thereof. In one embodiment, an input device or an output device from another computing device may be used as input device(s) 924 or output device(s) 922 for computing device 912.

Components of computing device 912 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 912 may be interconnected by a network. For example, memory 918 may be comprised of multiple physical memory units located in different physical locations interconnected by a network.

Those skilled in the art will realize that storage devices utilized to store computer readable instructions may be distributed across a network. For example, a computing device 930 accessible via a network 928 may store computer readable instructions to implement one or more embodiments provided herein. Computing device 912 may access computing device 930 and download a part or all of the computer readable instructions for execution. Alternatively, computing device 912 may download pieces of the computer readable instructions, as needed, or some instructions may be executed at computing device 912 and some at computing device 930.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, at least one of A and B and/or the like generally means A or B or both A and B.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A system for configuring a route-planning module, comprising:
    one or more processing units; and
    memory comprising instructions that, when executed by at least one of the one or more processing units, implement at least some of a plug-in component configured to:
        determine that graph configuration data of a graph configuration plug-in adheres to a graph editing convention;
        responsive to the graph configuration data adhering to the graph editing convention, applying the graph configuration plug-in to a graph to create a modified graph, the applying comprising modifying a structure of the graph based upon the graph configuration data specified by the graph configuration plug-in;
        determine that cost configuration data of a cost configuration plug-in adheres to a cost editing convention; and
        responsive to the cost configuration data adhering to the cost editing convention, applying the cost configuration plug-in to a collection of attributes associated with a directed edge within the modified graph to create a modified edge cost for the directed edge, the applying the cost configuration plug-in comprising calculating an inner product between the collection of attributes and the cost configuration data to create the modified edge cost, the modified graph usable by a route-planning module to create a route from a starting node to a destination node.

2. The system of claim 1, the graph configuration data comprising at least one of:
    remove a directed edge from the graph;
    add a directed edge to the graph;
    modify a directed edge within the graph;
    remove a node and one or more directed edges associated with the removed node from the graph;
    add a node to the graph and one or more directed edges associated with the added node; or
    modify a node within the graph.

3. The system of claim 1, the route-planning module comprising at least one of a traffic routing module, a social event planning module, a social network module, a trip planning module, a public transportation module, or an internet traffic routing module.

4. The system of claim 1, the graph comprising one or more nodes connected by one or more directed edges.

5. The system of claim 1, the graph configuration data extracted by the graph configuration plug-in from a source external to the route-planning module.

6. The system of claim 1,
    the route-planning module configured to:
        evaluate attributes associated with nodes and directed edges within the modified graph to create the route from the starting node to the destination node.

7. A computer readable device comprising instructions that, when executed, implement at least some of:
    a plug-in component configured to:
        determine that attribute configuration data of an attribute configuration plug-in adheres to an attribute editing convention;
        responsive to the attribute configuration data adhering to the attribute editing convention, applying the attribute configuration plug-in to a collection of attributes associated with a directed edge from a first node to a second node within a graph to create a modified collection of attributes for the directed edge, the applying comprising modifying the collection of attributes based upon the attribute configuration data specified by the attribute configuration plug-in;
        determine that cost configuration data of a cost configuration plug-in adheres to a cost editing convention; and
        responsive to the cost configuration data adhering to the cost editing convention, applying the cost configuration plug-in to the modified collection of attributes to create a modified edge cost for the directed edge, the applying the cost configuration plug-in comprising calculating an inner product between the modified collection of attributes and the cost configuration data to create the modified edge cost, the graph usable by a route-planning module to create a route from a starting node to a destination node.

8. The computer readable device of claim 7, the attribute configuration data comprising at least one of:
   add a new attribute to the collection of attributes;
   remove an attribute from the collection of attributes;
   modify an attribute within the collection of attributes; or
   modify a value of an attribute within the collection of attributes.

9. The computer readable device of claim 7, the plug-in component configured to:
   responsive to the cost configuration data adhering to the cost editing convention, applying the cost configuration data of the cost configuration plug-in to a turn cost associated with a node within the graph to create a modified turn cost for the node, the node associated with a first directed edge and a second directed edge, and the modified turn cost corresponding to a modified cost associated with turning from the first directed edge to the second directed edge.

10. The computer readable device of claim 7, comprising: the route-planning module configured to:
    evaluate attributes associated with nodes and directed edges within the graph to create the route from the starting node to the destination node.

11. The computer readable device of claim 7, the route-planning module associated with at least one of a traffic routing module, a social event planning module, a social network module, a trip planning module, a public transportation module, or an internet traffic routing module.

12. A method for configuring a route-planning module, comprising:
    determining that cost configuration data of a cost configuration plug-in adheres to a cost editing convention; and
    responsive to the cost configuration data adhering to the cost editing convention, applying the cost configuration plug-in to a collection of attributes associated with a directed edge within a graph to create a modified edge cost for the directed edge, the applying comprising calculating an inner product between the collection of attributes and the cost configuration data to create the modified edge cost, the graph usable by a route-planning module to create a route from a starting node to a destination node, at least some of the method implemented via a processing unit.

13. The method of claim 12, the cost configuration data corresponding to a weight for an attribute associated with the directed edge.

14. The method of claim 12, comprising:
    applying the cost configuration data to a turn cost associated with a node within the graph to create a modified turn cost for the node, the node associated with a first directed edge and a second directed edge, and the modified turn cost corresponding to a modified cost associated with turning from the first directed edge to the second directed edge.

15. The method of claim 14, the cost configuration data corresponding to a weight for an attribute associated with the node.

16. The method of claim 12, comprising:
    evaluating attributes associated with nodes and directed edges within the graph to create the route from the starting node to the destination node.

17. The method of claim 12, the route corresponding to at least one of a traffic route, a social event plan, a social network, a trip, a public transportation route, or an internet traffic route.

18. The method of claim 12, the directed edge representing a road on a map.

19. The method of claim 18, a node within the graph connecting two or more directed edges and representing an intersection between two or more roads on the map.

20. The method of claim 12, the determining comprising performing a syntax check.

* * * * *